US005451262A

United States Patent [19]

Diaz

[11] Patent Number: 5,451,262

[45] Date of Patent: Sep. 19, 1995

[54] SYRUP OF NATURAL CAROB SUGARS AND A PROCESS FOR ITS PRODUCTION

[75] Inventor: Carlos S. Diaz, Rocafort, Spain

[73] Assignee: Compania General Del Algarrobo De Espana S.A., Spain

[21] Appl. No.: 216,655

[22] Filed: Mar. 23, 1994

[30] Foreign Application Priority Data

Mar. 26, 1993 [ES] Spain .................................... 9300628

[51] Int. Cl.[6] ........................ C13D 1/00; B01D 15/08; A23L 1/05; A23G 3/00

[52] U.S. Cl. ........................................ 127/30; 127/43; 127/46.2; 127/53; 127/55; 210/635; 210/656; 210/198.2; 426/573; 426/653; 426/658

[58] Field of Search .................... 127/30, 43, 46.2, 53, 127/55; 210/635, 656, 198.2; 426/573, 653, 658

[56] References Cited

U.S. PATENT DOCUMENTS

| | | | |
|---|---|---|---|
| 3,367,783 | 2/1968 | Billerbeck | 426/573 |
| 3,658,556 | 4/1972 | Klein et al. | 426/573 |
| 4,160,042 | 7/1979 | Farr et al. | 426/387 |
| 4,282,264 | 8/1981 | Magnolato | 426/599 |
| 4,444,798 | 4/1984 | Magnolato et al. | 426/422 |
| 4,870,059 | 9/1989 | Mitsuhashi et al. | 514/53 |
| 4,999,197 | 3/1991 | Würsch | 424/195.1 |

OTHER PUBLICATIONS

*Industrial Gums*, Roy L. Whistler, ed. New York and London, Academic Press, 1973 (month not available); pp. 523–535.

*Primary Examiner*—Paul Lieberman
*Assistant Examiner*—Patricia L. Hailey
*Attorney, Agent, or Firm*—Ostrolenk, Faber, Gerb & Soffen

[57] ABSTRACT

A syrup of natural carob sugars having 55–75% sucrose, 7–15% fructose, 7–16% glucose, 0.5–3% other sugars, 4–14% cyclitols and 0.5–2% organic and inorganic impurities. Sugars are extracted from carob pulp and the juice thus obtained is subjected to chromatographic separation to separate the sugars from the non-sugars. The product obtained may be used in applications similar to those of other sugars.

12 Claims, 3 Drawing Sheets

WATERS DIAGRAM

WATERS DIAGRAM

THERMAL FLOW DIAGRAM

SYRUP OF NATURAL CAROB SUGARS AND A PROCESS FOR ITS PRODUCTION

The present invention relates to a colorless syrup which contains all the sugars of the carob, and a process for obtaining the syrup by forming an aqueous solution of the soluble components of carob pulp and purifying the resulting solution by physical and chemical means.

BACKGROUND OF THE INVENTION

The use of carob as a food product for humans has existed since early times. Nowadays it is still used as human food in some countries of the Mediterranean basin from where the fruit originates.

The field of application of the product provided by the present invention corresponds to uses which are similar to those of other sugars, but with an advantage in terms of the low cost of the product of the invention compared with the known sugars and in terms of the re-evaluation of the carob by finding for it a noble and constant application. It is worth remembering that Spain is the leading carob producing country in the world, supplying almost 50% of the world's total, and that it is a Mediterranean dry farming crop.

The fact that it is lower in cost than the sugars obtained from sugar beet, sugar cane and even national maize is of particular importance these days when, with the incorporation into the single European market, Spanish sugar beet and therefore sugar cannot compete with the more economical and higher quality European product. The reason for these lower costs are based on:

Lower raw material cost. To produce 1 kg of sugar about 3 kg of carob pulp are required (14/15 Pesetas/kg), compared to 8 kg of sugar beet (8/9 Pesetas/kg).

Considerably lower investment in installations and equipment. As it is a non-perishable raw material the installation can operate throughout the year. As it is richer in sugar, the volume which has to be processed is lower during the initial stages.

The cost of transformation is no greater.

The existence of syrups made from carob obtained in southern Italy, Portugal and in incipient form in Spain is known. This product corresponds to the first aqueous extraction of the carob pulp without purification and comprises a mixture of all the elements of the carob pulp which are soluble in water. It is strong and dark in colour, has an unpleasant odour and tastes of a mixture of sugars (sweet) and soluble tannins (bitter), i.e. it still retains the negative characteristics of color, odour and taste of the carob itself.

Repeated attempts to find processes of purification by means of applying ion-exchange resins are also known, but these processes have never become reality because they are not economical and have serious contamination problems.

The preparation of crystalline sucrose following the normal methods of the sugar industry gives a low yield due to the interference of the reducing sugars and other impurities which obstruct crystallization and make the process uneconomical.

The crystallization of sucrose from carob has been tried by means of processes other than those normally used for sugars but these too have proved to be uneconomical (Oddo, 1.936; Lafuente, 1.954). Vazquez Sanchez (1.934) precipitated sucrose with alkaline-earth metals but this method did not get past the laboratory stage. The work of Lafuente (1.952) made it possible to avoid the interference of the reducing sugars with the crystallization of sucrose by carrying out a selective fermentation of said sugars using yeasts. This procedure, which could have been economical, violated Spanish law which does not permit the production of alcohol, the product obtained as a result of the fermentation process.

Unable to obtain crystalline sugars, researchers turned to the production of liquid sugars and/or syrups with a high degree of purity. The techniques employed were based on the use of a clarification process which was expensive due to the type of additives which were necessary and the use of ion-exchange resins which were costly and had problems with regenerants. There was a small pilot line at the end of the 1950's (Cortës Navarro, Primo Yüfera, 1.961).

After the above mentioned experiences there are no other known technical attempts to solve the process designed to obtain a colorless, odorless syrup which contains all the sugars of the carob in natural form.

By analyzing the chemical composition of the carob pulp it is clear that the nutritional value is concentrated in the water soluble part, since the insoluble part (fibre, cellulose and hemicelluloses) cannot be digested by the human organism. Within the soluble part, the sugars form $\frac{3}{4}$ of the dry matter, the cyclitols about 1/10 and the rest, which has little weight, consists of a series of other products which give the first broth its dark color and which give the carob its characteristic odor and flavor, which are not too pleasant according to current tastes.

Given these facts, research was directed to obtaining a natural carob extract from which the negative characteristics of the juice in its natural state, i.e. color, odor and taste, had been eliminated.

SUMMARY OF THE INVENTION

In accordance with the invention, a syrup of natural carob sugars, free of the negative characteristics of color, odor and taste of natural carob extract, has the following composition:

Sucrose: 55–75%
Fructose: 7–15%
Glucose: 7–16%
Other Sugars: 0.5–3%
Cyclitols: 4–14%
Organic and inorganic
impurities: 0.5–2% where the percentages are expressed in weight of the dry matter.

The process for obtaining the syrup of natural carob sugars comprises the following stages:

a) The carob fruit from the field is subjected to mechanical operations to separate the foreign elements, it is washed in water and dried by a current of air;

b) The pods are cut up sufficiently to release the seed, preferably until they pass through a sieve with a hole diameter of 12 to 20 mm;

c) The cut up material obtained in the previous stage is subjected to a separation-sieving operation to separate on the one hand the seeds and on the other the pulp; the pulp being subjected to classification, preferably until it has a granulometry of less than 10 mm;

d) The pulp, cut up to the appropriate granulometry, is subjected to a continuous extraction process in which the pulp is put in contact with diffusion water for the minimum amount of time necessary, in order to avoid the proliferation of microorganisms, to obtain a raw juice, with concentration of between 30° and 50° Brix, and a waste pulp which constitutes the insoluble fraction of the carob pulp;

e) The waste pulp is pressed in order to extract a substantial part of the water it carries, the water still containing in solution sugars and various non-sugars and being recycled for the extraction of sugars in the previous stage;

f) The raw juice obtained in the extraction process is filtered to remove particles of carob fruit in suspension whose size is=25 μm;

g) The juices are decalcified by a cationic resin charged with $Na^+$ ions;

h) The juices are filtered once again this time through fine filters in order to remove particles whose size is=5 μm;

i) The raw juice is evaporated and concentrated from a concentration of 30°-50° Brix as it leaves the extraction stage to a concentration of approximately 60° Brix;

j) The sugars and non-sugars of the juice obtained in the previous stage are separated chromatographically by passing the juice through a column of strong cationic resin based on weakly reticulate polystyrene and whose active sulphonic groups are charged with a monovalent cation, preferably sodium or potassium, the column then being washed with water to obtain a saline fraction which has a low degree of purity, followed by a fraction which is low in salts and rich in sugars with a high degree of purity, an intermediate fraction being recirculated to the column;

k) The fraction rich in sugars with a high degree of purity is subjected to additional purification by ionic exchange in two phases, the first to separate the dissolved salts and the second to separate the coloring elements, to obtain a juice which is essentially pure and which has a concentration of 20°-25° Brix; and l) The juice obtained in the previous stage is concentrated to levels of approximately 65°-70° Brix.

Other features and advantages of the present invention will become apparent from the following description of the invention which refers to the accompanying drawings.

DESCRIPTION OF THE INVENTION

Figure 1:
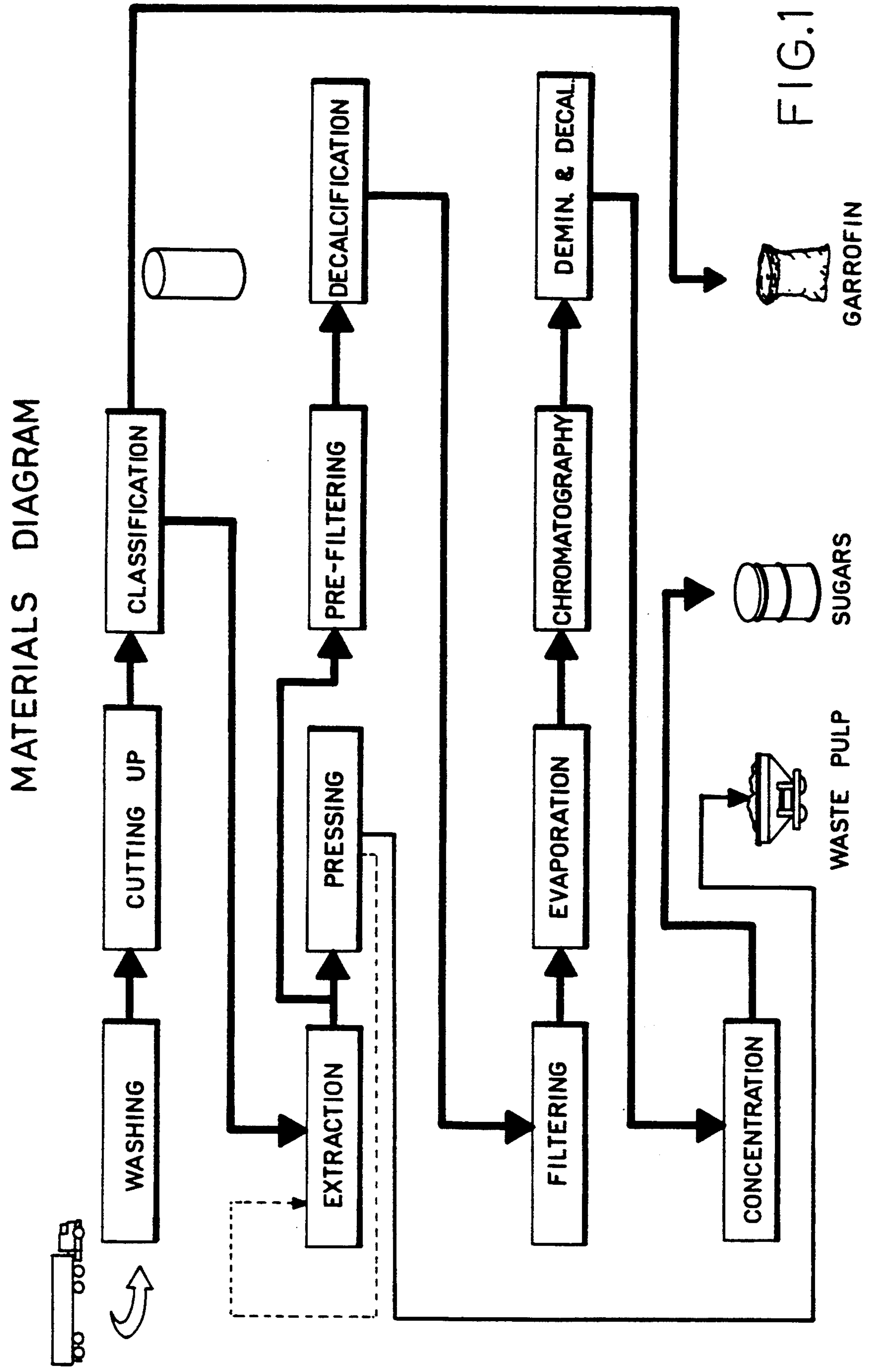
FIG. 1 is a materials diagram of the process.
Figure 2:
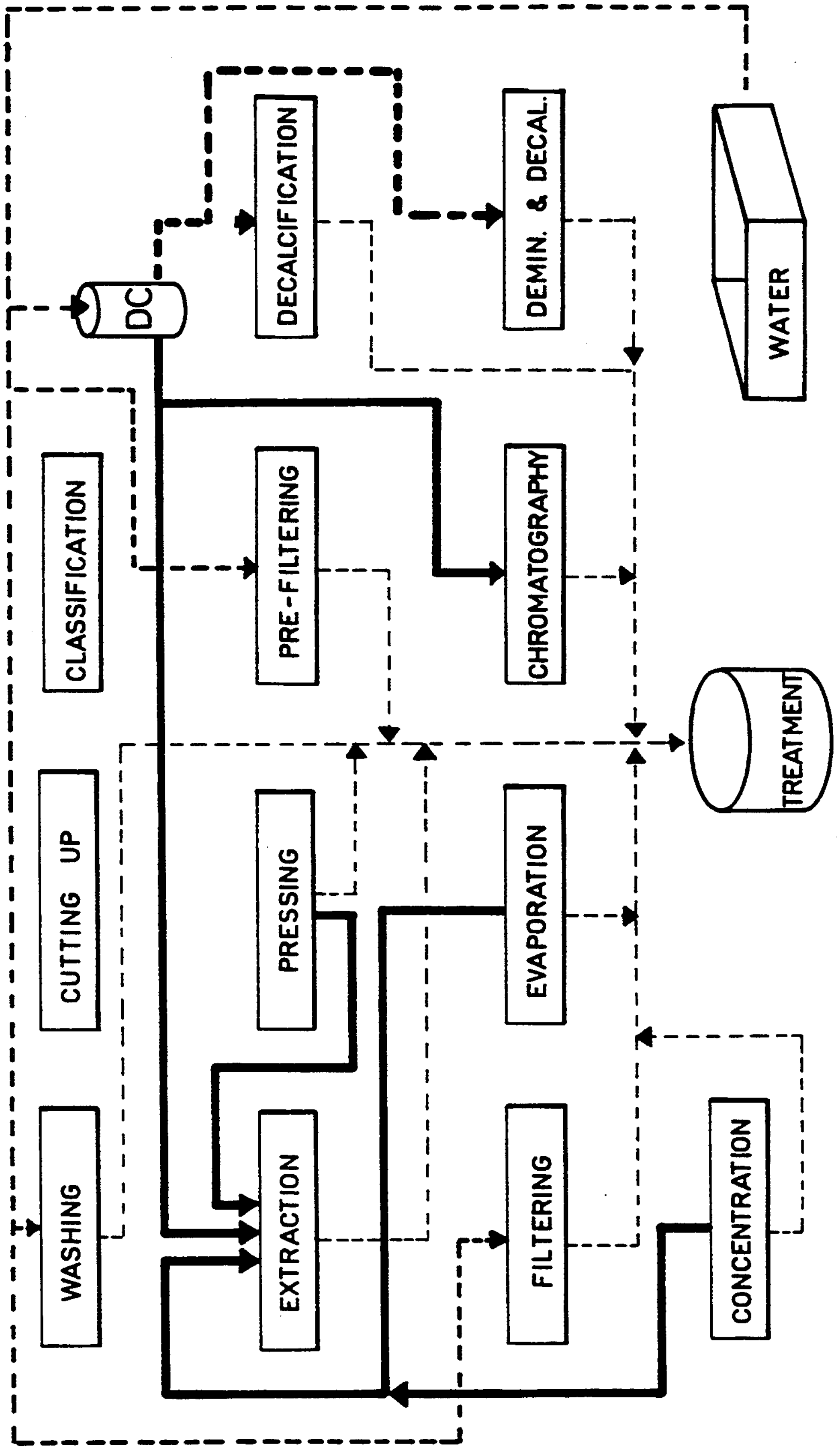
FIG. 2 is a waters diagram of the process.
Figure 3:
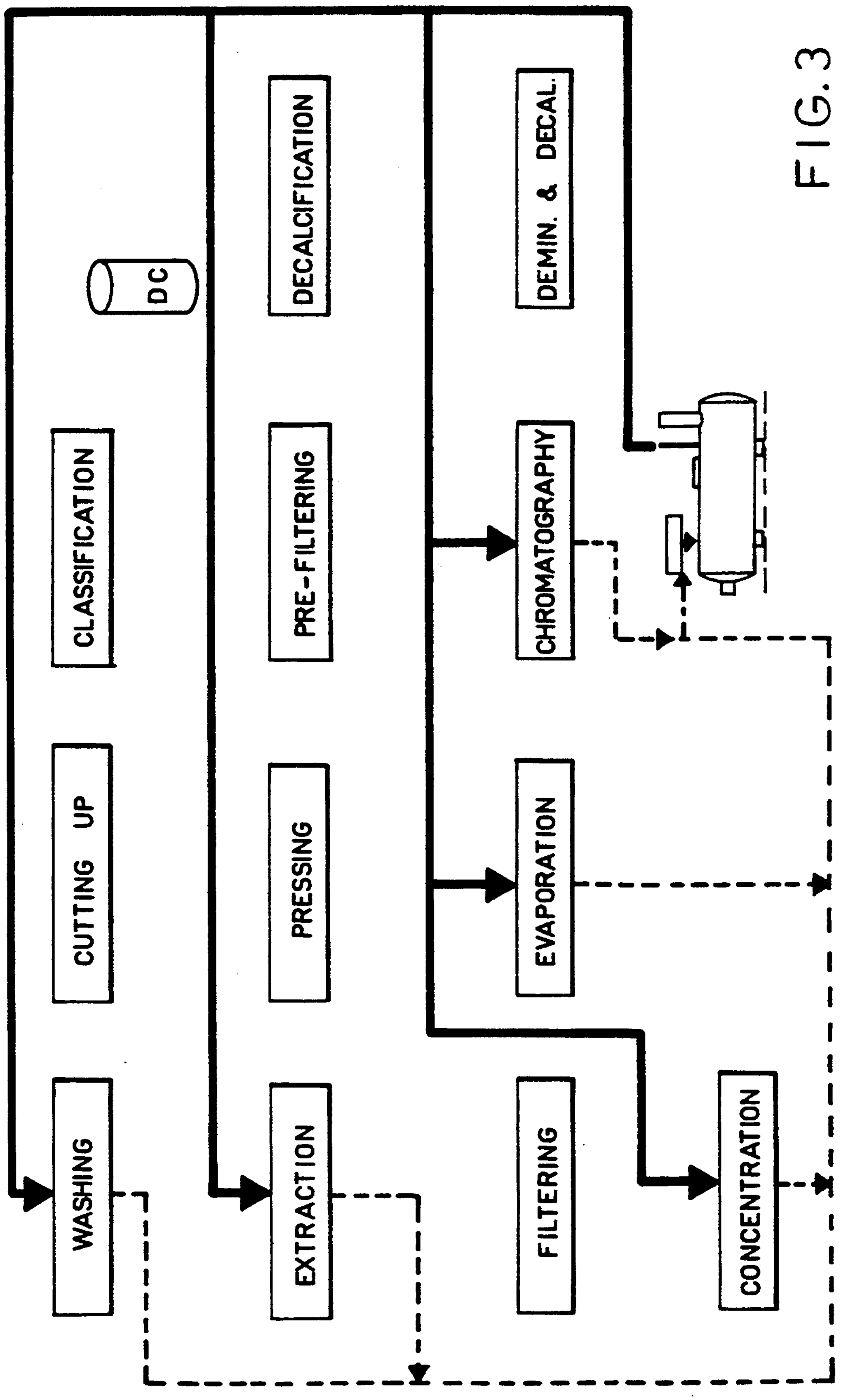
FIG. 3 is a thermal flow diagram of the process.

The present invention provides a process for obtaining a natural carob syrup, free of the above mentioned unwanted characteristics, by means of new techniques in which the main technique is industrial chromatography and where the set of parameters of the phases of which it consists gives rise to a considerable reduction in the cost of the process and the amount of investment compared to the production of sugars by the traditional means used by sugar companies, as well as a reduction in cost of the raw material by incorporating carob pulp into the sugar market.

The problem related to obtaining the product according to the invention was essentially to achieve a technically accomplished process which could be used to obtain the large quantity of sugars which the carob pulp contains in natural form and in an economical way, but with conditions and a degree of purity which enable it to be marketed. The technical problems which had to be resolved involved two critical points: the extraction of the sugars from the carob pulp and the purification of the resulting juice. Consequently, work was concentrated in these two areas.

With regard to the sugar extraction phase it should be remembered that the carob pulp consists of a multitude of cells separated from their neighbours and enclosed by a cell wall. This cell wall is totally permeable to dissolved substances, unlike the ectoplasmic membrane before the fruit is fully ripe which only allows the passage of water.

It has now been discovered that surprisingly the ectoplasmic membrane of the dry fruit loses this property and allows the migration of molecules of water, enabling the sugars to be extracted at normal temperatures and without having to resort to increasing the temperature in order to achieve the same effect as is done in the extraction of sugar from sugar beet during the traditional sugar factory process. Over-crushing the carob, breaking the coll wall, and increasing the temperature of the water used for extraction provoke the diffusion of other elements considered as impurities which have to be eliminated in later stages of the process.

With regard to the purification of the juice which results from the extraction of the carob pulp, there have until now been numerous agents and procedures used in order to carry out the purification and clarification of the extract. Among them it is worth mentioning purfication with milk of lime, with lime and alumina, with bentonites, with active carbon, with anionic resins and combinations of these methods. All of these methods gave very poor results.

After continuous research it was shown that surprisingly chromatographic purification gave excellent results in the separation of the non-sugars from the juice derived from the extraction of the carob pulp.

The filtered and decalcified juice is passed through a column of resins consisting basically of a strong cationic resin based on weakly reticulate polystyrene and whose active sulphonic groups are charged with a monovalent cation (K or Na).

As the juice passes through the bed of resins, the small non-ionized molecules, such as the sucrose molecules, enter the narrow channels by diffusion and are absorbed by the resin, whilst the ionized non-sugars (such as the organic or mineral acid salts) are excluded by the action of the electrical charges of the active groups. Furthermore, the large molecules (the colorings, the polysaccharides, etc.) cannot enter the network because of their size, the resin acting as a molecular sieve.

After a certain amount of juice has passed, the column is washed with pure water which is what carries out the chromatographic separation. The first output produces the saline fraction which has a low degree of purity, followed by a fraction which is low in salts and rich in sugars with a fairly high degree of purity. An intermediate fraction is recirculated, since the cutoff between the two fractions is not a clean one.

There is no ionic exchange and no regeneration between cycles. Nevertheless, resins have to be added periodically as they are naturally used up.

As the process is discontinuous, the procedure is carried out with several columns whose cycles are offset and fully automated. Each phase and its separation into the corresponding fractions is checked and controlled by the characteristics of the solution, which is analyzed by means of conductivimeters (salt content), polarimeters (sugar content) and refractometers (dry matter or Brix content).

Consequently, after the stages of extraction and purification of the juice derived from the carob juice have been carried out and followed by processing, a natural syrup of carob sugars is obtained and which has the following advantages over existing products whose principle components are the usual sugars (sucrose, fructose and glucose):

Advantages over raw carob syrup:

*Elimination of the color, taste and odor which made it impossible to market and use as a natural sugar.

Advantages over existing products obtained from sugar beet and sugar cane (crystalline sugars or liquid sugars) and over the isoglucoses obtained from maize:

*Reduced production costs, since both the raw material used and the production process are intrinsically less expensive.

Therefore, and according to a first aspect, the present invention provides a natural carob syrup consisting of the following components:

Sucrose: 55–75%
Fructose: 7–15%
Glucose: 7–16%
Other sugars: 0.5–3%
Cyclitols: 4–14%
Organic and inorganic
impurities: 0.5–2% where the percentages are expressed in weight of the dry matter and are within certain logical limits depending on the fruit (variety, harvest, agricultural land, etc.)

According to the invention this natural carob extract, in commercial form, diluted in water at a concentration of 50–70% dry matter, is a sweet tasting dense fluid, light in color in concentrated form and transparent in normal dilution. It has a gentle fruity odor. The average pH value varies around 5 and corresponds to a slightly acidic behaviour.

Due to the presence of cyclitoles in the solution it is difficult for microorganisms (bacteria, yeasts, etc.) to reproduce which is an advantage for storage.

Furthermore, and according to a second aspect, the invention provides a procedure for obtaining the natural carob extract with the above mentioned composition and which consists of the following phases:

1. Cleaning the Carob

The fruit from the fields is normally accompanied by a series of foreign elements such as stones, twigs, metallic elements, as well as the earth which sticks to the carob particularly if it was harvested during a rainy period.

The first operation consists of cleaning the carob of all of these foreign elements by separating them mechanically, cleaning the carob with water and drying to obtain the clean fruit, free of other material such that it is hygienically ready to go on to the cutting up phase.

2. Cutting Up

Taking advantage of the fragility of the carob and the hardness of the seed (Garrofin), it is passed through a hammer mill where the pod is cut up sufficiently to release the seed. In practice, it is crushed until it passes through a perforated sheet sieve, with a hole diameter of 12 to 20 mm, situated inside the mill.

This phase produces a raw material which fulfills the conditions of hygiene required for food, something which is completely impossible when using the cut up product currently on the market since, because of its traditional use as an ingredient of mixed feed, current installations do not fulfil the minimum sanitary requirements.

3. Classification

The cut up material obtained from the crushing mill is fed continuously into a separator-sieve which consists of various sieves which separate on the one hand the garrofin and on the other the pulp according to whether the particles are inferior or equal/superior in size to the garrofin. This last fraction is re-fed to the mill in order to obtain a granulometry of less than 10 mm.

A high granulometry prevents a good yield from being obtained in the following phase of diffusion. The considerable formation of flour would obstruct the diffusion process and cause clogging problems.

A particle size of about 5/6 mm has to be aimed for, with the minimum formation of flour. Obviously the behaviour of the fruit during the mechanical process will be different depending on the moisture content and agronomic variety, which implies the need for different adjustments.

4. Extraction

The carob pulp, cut up to the appropriate granulometry, is fed into a continuous extraction machine.

The output from this machine is a raw juice, dark brown in color, sweet with a bitter aftertaste and with the characteristic odor of carob. The other output produces a waste pulp soaked in water which contains the insoluble fraction of the carob pulp.

The working conditions in this phase are:

Contact time: The pulp and the diffusion water must be in contact for the minimum amount of time necessary, in order to avoid the proliferation of microorganisms and their corresponding infections. The contact time is between 1 and 3 hours depending on the variety and moisture content.

The temperature is between 15 and 30 degrees centigrade.

The working pH is between 4.6 and 5.4, independently of the pH of the water supply.

The output concentration is between 30 and 50° BRIX. Concentrations of less than 30° BRIX are not advisable because of profitability in the evaporation stage, nor are concentrations greater than 50° BRIX recommended due to problems in the filtration process and the passage through the demineralization columns.

5. Pressing of Waste Pulp

When the pulps come out of the diffusor their water content is very high: 70–80%, i.e. 30–20% dry matter. It is essential to press these pulps before they are used in any way.

The pressing process enables a considerable proportion of the water carried by the pulps to be extracted mechanically, said water still containing in solution sugars and various non-sugars. This water is used for extracting the sugars in the previous stage, thereby achieving a considerable saving in water and avoiding undesirable wastage.

An efficient pressing process reduces the water content to 55–65%, i.e. 45–35% dry matter. The water recovered by this procedure may form 37–47% of that carried by the pulp in the diffusion phase.

This operation is carried out using vertical or horizontal double or single helix continuous presses.

The working conditions in this phase are:

Drip time: This depends on the type of press.

The pressing temperature is related to the diffusion output, although considering that the lower the temperature the higher the dynamic viscosity of the pressing water, it is not beneficial to store between the two operations. A pH of between 6 and 5 can be considered as the optimum value.

6. Pre-Filtering

The raw juice obtained from the extraction process carries large carob particles in suspension since they are evacuated during the extraction process.

In order to avoid mechanical problems in the decalcification columns, these particles are eliminated by means of a continuous filtration process by passing the juice through industrial filters.

The working conditions in this phase are:

Room temperature.

Retained particle size=25 μm.

7. Decalcification, $Ca^{++}$ and $Mg^{++}$

The juice contains a high quantity of $Ca^{++}$ and $Mg^{++}$ ions, varying between 600 and 1000 ppm depending on the variety, land and harvest. This high content would quickly give rise to encrustations which could be of great significance in the evaporation stage. Deposits in the pipes would give rise to a notable reduction in the heat exchange coefficient.

To decalcify the juice it is passed through cationic resin charged with $Na^{+}$ ions. The $Ca^{++}$ ions in the juice replace the $Na^{+}$ ions of the resin, which go into solution to form sodium salts which are much more soluble than calcium salts and which are not deposited in the evaporation stage. Technically it is possible to remove 100% of the calcium salts but in practice a small quantity is left in the juice in order to protect against corrosion in the evaporation stage.

If the raw material has a high $Ca^{++}$ content, and in order to reduce this section, the juice must be passed beforehand through a carbon dioxide Decalcification Plant similar to those used in sugar factories during the carbonating process.

The working conditions during this phase depend on those indicated and specified for the resin which is used.

8. Fine Filtering

The juices are filtered through a fine filter.

The working conditions in this phase are:

Room temperature, although the filtering process is favored by high temperatures.

Retained particle size=5 μm.

9. First Evaporation and Concentration

Before the stage of chromatographically separating the non-sugars the raw juice must be concentrated from 30° Brix diffusion to 60° Brix recommended for this phase. To do this, about 500 grams of water have to be evaporated per kilogram of juice that enters.

The concentration process is carried out in multiple effect evaporators bearing in mind that the juice must not be subjected to prolonged heat in order to prevent the formation of new reducing sugars and the destruction of the sugar by the formation of caramel, which would initially give rise to a fairly significant increase in coloration and a degradation in the final sugar quality.

The working conditions in this phase are:

Temperatures which start at 126° C. in the first stage and reduce are reduced progressively to 120°, 111° and 97° C.

10. Separation of Non-sugars by Chromatography

The syrup obtained in the previous stage is dark brown in color and is considerably cloudy. This is due to the existence of certain soluble tannins and other non-sugar impurities which are present in the extract as colloidal particles.

Although this product could be used in certain industrial or food applications, a method was looked for to purify it until the result was a sugar extract that was transparent (without particles in suspension) and colorless (by eliminating the soluble tannins).

In this operation the sugars are separated from the non-sugars.

The filtered and decalcified juice is fed through a column of resins consisting basically of a strong cationic resin based on weakly reticulate polystyrene and whose active sulphonic groups are charged with a monovalent cation (K or Na).

As the juice passes through the bed of resins, the small non-ionized molecules, such as the sucrose molecules, enter the narrow channels by diffusion and are absorbed by the resin, whilst the ionized non-sugars (such as the organic or mineral acid salts) are excluded by the action of the electrical charges of the active groups. Furthermore, the large molecules (the colorings, the polysaccharides, etc.) cannot enter the network because of their size, the resin acting as a molecular sieve.

After a certain amount of juice has passed, the column is washed with pure water which is what carries out the chromatographic separation. The first output produces the saline fraction which has a low degree of purity, followed by a fraction which is low in salts and rich in sugars with a fairly high degree of purity. An intermediate fraction is recirculated, since the cutoff between the two fractions is not a clean one.

There is no ionic exchange and no regeneration between cycles. Nevertheless, resins have to be added periodically as they are naturally used up.

The working conditions in this phase are:

The temperature depends on the apparatus and resin. It is normally between 50° and 60° C.

Similarly, the rates, pressure and times depend on the equipment used.

11. Demineralization and Decoloration by Resins

The separation carried out in the previous does not enable all the non-sugars to be eliminated. Although the degree of purity is high there remain traces of coloring elements which have to be eliminated in order to achieve the clean, transparent syrup which the market demands.

This purification is carried out by means of ionic exchange columns, the first of which are DEMINERALIZING columns and the second DECOLORING columns.

In the demineralization stage both the cations and anions are eliminated simultaneously, i.e. the salts dissolved in the juice, said juice being passed through cationic resins charged with $H^{+}$ ions, the cations of the juice being replaced by $H^{+}$ ions and reducing the pH. Afterwards it passes through an anionic resin charged with $OH^{-}$ ions, the anions of the juice being replaced by $OH^{-}$ ions which combine with the $H^{+}$ cations to form water and reestablish the pH. The cationic exchanger is regenerated with an acidic solution (sulphuric or nitric acid) and the anionic exchanger with alkali (ammonia) with the possibility of using the regenerating waters as an agricultural fertilizer.

As it is strongly acidic at the output of the cationic exchanger of the juice, it is impossible to completely prevent the sucrose from becoming inverted, but in order that the inversion is not too great, it is useful to maintain the temperature of the juice below 15° C.

In the decoloration stage the colorings of the juice are eliminated by means of decoloring resins having anionic ion exchangers in the form of chlorides which can be regenerated with sodium chloride solution.

The working conditions in this phase are:

Temperature less than 15° C.

M.S. Concentration between 20 and 25 Brix.

12. Final Evaporation and Concentration

The juice obtained in the previous stage, with a concentration of 20–24 Brix, has to be concentrated to the commercial levels of 65–70 Brix for storage reasons and for economy in its transportation to the consumer.

The procedure and the equipment used are similar to those described in stage 9, FIRST EVAPORATION AND CONCENTRATION. The only differences are the input and output concentrations and, as a result, the handling capacity of the apparatus.

Having described the process of the present invention it only remains to be said that during the course of said process other products are obtained. In phase 3 garrofin is produced, and which is marketed directly or transformed into an additive. In phase 5 the raw material for the manufacture of Natural Carob Fibre is obtained, and which is the object of another patent application presented on the same date as the present one.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

I claim:

1. A process for obtaining a syrup of natural carob sugars. having at least about 69% sucrose, fructose, and glucose comprising the steps of:

a) subjecting carob fruit to cleaning operations;

b) cutting the carob fruit to release the seed thereby forming a mixture comprising carob seeds and pulp;

c) subjecting the mixture from step b) to a separation-sieving operation to separate the carob seeds from the pulp;

d) subjecting said pulp from step d) to classification so as to have a specified granulometry;

e) subjecting the pulp from step d) to a continuous extraction process comprising contacting the pulp with diffusion water for sufficient time to avoid the proliferation of microorganisms, thereby obtaining 1) a raw juice having concentration of between 30° and 50° Brix, and 2) a waste pulp;

f) pressing the waste pulp from step e) to extract a solution comprising water, sugars and non-sugars;

g) recycling the solution from step f) to step e);

h) filtering the raw juice from step e) to remove suspended particles of carob fruit;

i) decalcifying the raw juice by a cationic resin charged with $Na^+$ ions;

j) filtering the juice from step i) through filters sufficient to remove particles having a size 5 μm;

k) concentrating the juice from step j) to a concentration of approximately 60° Brix;

l) separating chromatographically the sugars and non-sugars of the juice from step k) by passing the juice through a column of strong cationic resin based on weakly reticulate polystyrene and whose active sulphonic groups are charged with a monovalent cation;

m) washing the column to obtain 1) a saline fraction having a low degree of purity, and 2) a fraction which is low in salts and rich in sugars with a high degree of purity;

n) recirculating an intermediate fraction from step m) to step l);

o) subjecting the fraction rich in sugars with a high degree of purity from step m) to additional purification by ionic exchange in two phases, the first phase to separate the dissolved salts and the second phase to separate the coloring elements, to obtain a juice having a concentration of 20°–25° Brix; and p) concentrating the juice from step o) to approximately 65°–70° Brix.

2. A process according to claim 1, wherein step e) comprises contacting the pulp with the diffusion water for a time period from 1 to 3 hours, at a temperature of 15° to 30° C. and at a pH of between 4.6 and 5.4.

3. A process according to claim 1, wherein step f) includes the step of maintaining the pH between 5 and 6.

4. A process according to claim 1, wherein step k) includes evaporating the juice in multiple effect evaporators at an initial temperature of approximately 126° C.

5. A process according to claim 4, further comprising the step of progressively reducing the temperature to 97° C.

6. A process according to claim 1, wherein step 1) is carried out at temperatures of between 50° and 60° C.

7. A process according to claim 1, wherein step o) is carried out at temperatures below 15° C.

8. A process according to claim 1, wherein step a) comprises the steps of: a-1) separating foreign elements from the carob fruit; a-2) washing the carob fruit in water; and a-3) drying the carob fruit.

9. A process according to claim 1, wherein step b) comprises the step of crushing the carob fruit to a size sufficient to pass through a sieve with a hole diameter of 12 to 20 mm.

10. A process according to claim 1, wherein step d) comprises classifying the pulp to have a granulometry of less than 10 mm.

11. A process according to claim 1, wherein step h) comprises removing particles having a size of 25 μm.

12. A process according to claim 1, wherein in step 1) the monovalent cation is sodium or potassium.

* * * * *